(12) United States Patent
Okuda

(10) Patent No.: US 7,099,088 B2
(45) Date of Patent: Aug. 29, 2006

(54) LENS DRIVE MECHANISM

(75) Inventor: Isao Okuda, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/183,954

(22) Filed: Jul. 19, 2005

(65) Prior Publication Data

US 2006/0018037 A1    Jan. 26, 2006

(30) Foreign Application Priority Data

Jul. 21, 2004    (JP) .............................. 2004-213269

(51) Int. Cl.
*G02B 15/14*   (2006.01)
*G02B 7/02*    (2006.01)

(52) U.S. Cl. .................. 359/696; 359/694; 359/823

(58) Field of Classification Search ................. 359/696, 359/694, 697, 703, 704, 821, 823, 824, 829, 359/698
See application file for complete search history.

(56) References Cited

U.S. PATENT DOCUMENTS

| | | | | |
|---|---|---|---|---|
| 5,966,248 | A | * | 10/1999 | Kurokawa et al. ............ 359/697 |
| 6,501,604 | B1 | * | 12/2002 | Onda ........................... 359/696 |
| 6,599,035 | B1 | | 7/2003 | Ichinokawa .................. 396/349 |
| 6,714,357 | B1 | | 3/2004 | Yamazaki ..................... 359/696 |
| 6,795,251 | B1 | | 9/2004 | Nomura et al. .............. 359/694 |
| 6,813,441 | B1 | | 11/2004 | Yamazaki ..................... 396/82 |

FOREIGN PATENT DOCUMENTS

| | | |
|---|---|---|
| JP | 2003-131111 | 5/2003 |
| JP | 2003-222932 | 8/2003 |
| JP | 2004-070014 | 3/2004 |

OTHER PUBLICATIONS

English language Abstract of JP 2004-070014.
English language Abstract of JP 2003-131111.

* cited by examiner

*Primary Examiner*—Ricky Mack
*Assistant Examiner*—M. Hasan
(74) *Attorney, Agent, or Firm*—Greenblum & Bernstein, P.L.C.

(57) ABSTRACT

A lens drive mechanism includes a rotatable lead screw driven to rotate about an axis thereof, the axis extending parallel to an optical axis of a lens group; a non-rotatable guide shaft which extends parallel to the rotatable lead screw; a nut member made of synthetic resin which includes a screw engaging portion, with which the rotatable lead screw is screw-engaged, and a rotation-prevention portion, which is engaged with the non-rotatable guide shaft to prevent the nut member from rotating about the rotatable lead screw; and a lens support frame which supports the lens group and is movable together with the nut member in an optical axis direction. The rotation-prevention portion of the nut member includes a pair of holding portions which are formed integral with the nut member so as to resiliently contact the non-rotatable guide shaft.

18 Claims, 7 Drawing Sheets

LENS DRIVE MECHANISM

BACKGROUND OF THE INVENTION

1. Field of the Invention

The present invention relates to a lens drive mechanism for moving a lens group linearly along an optical axis.

2. Description of the Related Art

Conventional lens drive mechanisms mainly for moving a focusing lens group (movable lens group) linearly along an optical axis are generally provided with a lens support frame which supports the focusing lens group, a rotatable lead screw (feed screw shaft) rotatable on its axis and parallel to the optical axis, a motor (stepper motor) for rotating the rotatable lead screw, a guide shaft parallel to the optical axis, and a nut member (driven member) which is supported by the rotatable lead screw and the guide shaft to be linearly moved together with the lens support frame in the optical axis direction by a rotation of the rotatable lead screw. This type of conventional lens drive mechanism is disclosed in Japanese Unexamined Patent Publication No. 2003-222932.

As an example of such a type of lens drive mechanism, a lens drive mechanism in which the nut member is provided with a screw engaging portion which is screw-engaged with the rotatable lead screw and an engaging groove in which the guide shaft is engaged to prevent the nut member from rotating about the rotatable lead screw by the engagement of the guide shaft with the engaging groove is known in the art. In this type of lens drive mechanism, a rotation of the rotatable lead screw causes the nut member to move linearly together with the lens support frame along the guide shaft (and the rotatable lead screw).

The nut member which serves as an element of the above described type of lens drive mechanism is generally made of metal. However, in the case where the nut member is made of metal, the frictional resistance between the nut member and the guide shaft becomes great if the guide shaft and the engaging groove of the nut member are in contact with each other at all times, thus making the linear movement of the nut member is not smooth. To overcome this problem, it is common to form the engaging groove so as to have a large inner diameter to create a clearance between the guide shaft and the engaging groove.

However, if a substantial clearance exits between the guide shaft and the engaging groove, the nut member (the engaging groove thereof) and the guide shaft hit against each other to make objectionable noise during linear movement of the nut member.

SUMMARY OF THE INVENTION

The present invention provides a lens drive mechanism which does not make unpleasant noise from between the nut member and the nut member (or between the nut member and a rotation-prevention projection which projects from the lens support frame), and further which provides a smooth linear movement of the nut member.

According to an aspect of the present invention, a lens drive mechanism is provided, including a rotatable lead screw driven to rotate about an axis thereof, the axis extending parallel to an optical axis of a lens group; a non-rotatable guide shaft which extends parallel to the rotatable lead screw; a nut member made of synthetic resin which includes a screw engaging portion, with which the rotatable lead screw is screw-engaged, and a rotation-prevention portion, which is engaged with the non-rotatable guide shaft to prevent the nut member from rotating about the rotatable lead screw; and a lens support frame which supports the lens group and is movable together with the nut member in an optical axis direction. The rotation-prevention portion of the nut member includes a pair of holding portions which are formed integral with the nut member so as to resiliently contact the non-rotatable guide shaft so that at least one of the pair holding portions is resiliently deformed.

It is desirable for at least one of the pair of holding portions to include a U-shaped folded portion which is resiliently deformed to be in pressing contact with the non-rotatable guide shaft.

It is desirable for the screw engaging portion of the nut member to include a female screw hole having a circular shape in cross section.

It is desirable for the lens drive mechanism to include a motor for rotating the rotatable lead screw, wherein the rotatable lead screw is coaxially formed integral with a rotary output shaft of the motor.

It is desirable for the lens support frame is linearly guided in the optical axis direction by at least one guide shaft extending in the optical axis direction.

It is desirable for the lens support frame to be continuously biased in a direction along the optical axis by a spring member.

The lens group can be a focusing lens group.

The lens group can be a lens group serving as an element of a zoom lens system.

It is desirable for the pair of holding portions to resiliently hold the guide shaft therebetween from opposite directions at all times.

The screw engaging portion can include a female screw hole in which the rotatable lead screw is screw-engaged.

In an embodiment, a lens drive mechanism is provided, including a lens support frame which supports a lens group and is linearly guided along an optical axis without rotating about the optical axis; a rotatable lead screw driven to rotate about an axis thereof and extending parallel to the optical axis; and a nut member made of synthetic resin which includes a rotation-prevention portion which is engaged with the lens support frame to prevent the nut member from rotating about the rotatable lead screw; and a screw engaging portion with which the rotatable lead screw is screw-engaged, wherein the nut member causes the lens support frame to move together with the nut member in the optical axis direction by a rotation of the rotatable lead screw. The rotation-prevention portion of the nut member includes a pair of holding portions which are formed integral with the nut member to resiliently contact a rotation-prevention projection which projects from the lens support frame, so that at least one of the pair of holding portions is resiliently deformed.

It is desirable for the screw engaging portion of the nut member to include a female screw hole having a circular shape in cross section.

It is desirable for the rotation-prevention projection to include a first rotation-prevention projection and a second rotation-prevention projection which projects from an end of the first rotation-prevention projection, the second rotation-prevention projection having a smaller cross section than the first rotation-prevention projection, wherein the pair of holding portions are in contact with the first rotation-prevention projection and the second rotation-prevention projection from opposite directions, respectively.

It is desirable for the lens drive mechanism to include a motor for rotating the rotatable lead screw, wherein the rotatable lead screw is coaxially formed integral with a rotary output shaft of the motor.

It is desirable for the lens support frame to be linearly guided in the optical axis direction by at least one guide shaft extending in the optical axis direction.

It is desirable for the lens support frame to be continuously biased in a direction along the optical axis by a spring member.

It is desirable for the lens group to include a focusing lens group.

It is desirable for the lens group to include a lens group serving as an element of a zoom lens system.

According to the present invention, unpleasant noise is effectively prevented from being made between the nut member and the guide shaft (or between the nut member and the rotation-prevention projection of the lens support frame), and the nut member is linearly movable smoothly when the lens group moves in the optical axis direction because the pair of shaft holding portions resiliently hold the guide shaft (or the rotation-prevention projection of the lens support frame). Moreover, the nut member and the rotatable lead screw can be screw-engaged with each other securely so that the lens group supported by the lens support frame can be moved with stability even if the nut member is not made thick.

The present disclosure relates to subject matter contained in Japanese Patent Application No. 2004-213269 (filed on Jul. 21, 2004) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

A first embodiment of a lens drive mechanism according to the present invention will be hereinafter discussed with reference to FIGS. 1 through 5. In the following description, FIG. 1 serves as a reference of orientation of the lens drive mechanism; the left side and the right side of FIG. 1 correspond to the object side (front side) and the image-plane side (rear side) of the lens drive mechanism, respectively.

First of all, the overall structure of the lens drive mechanism will be discussed hereinafter.

Figure 1:
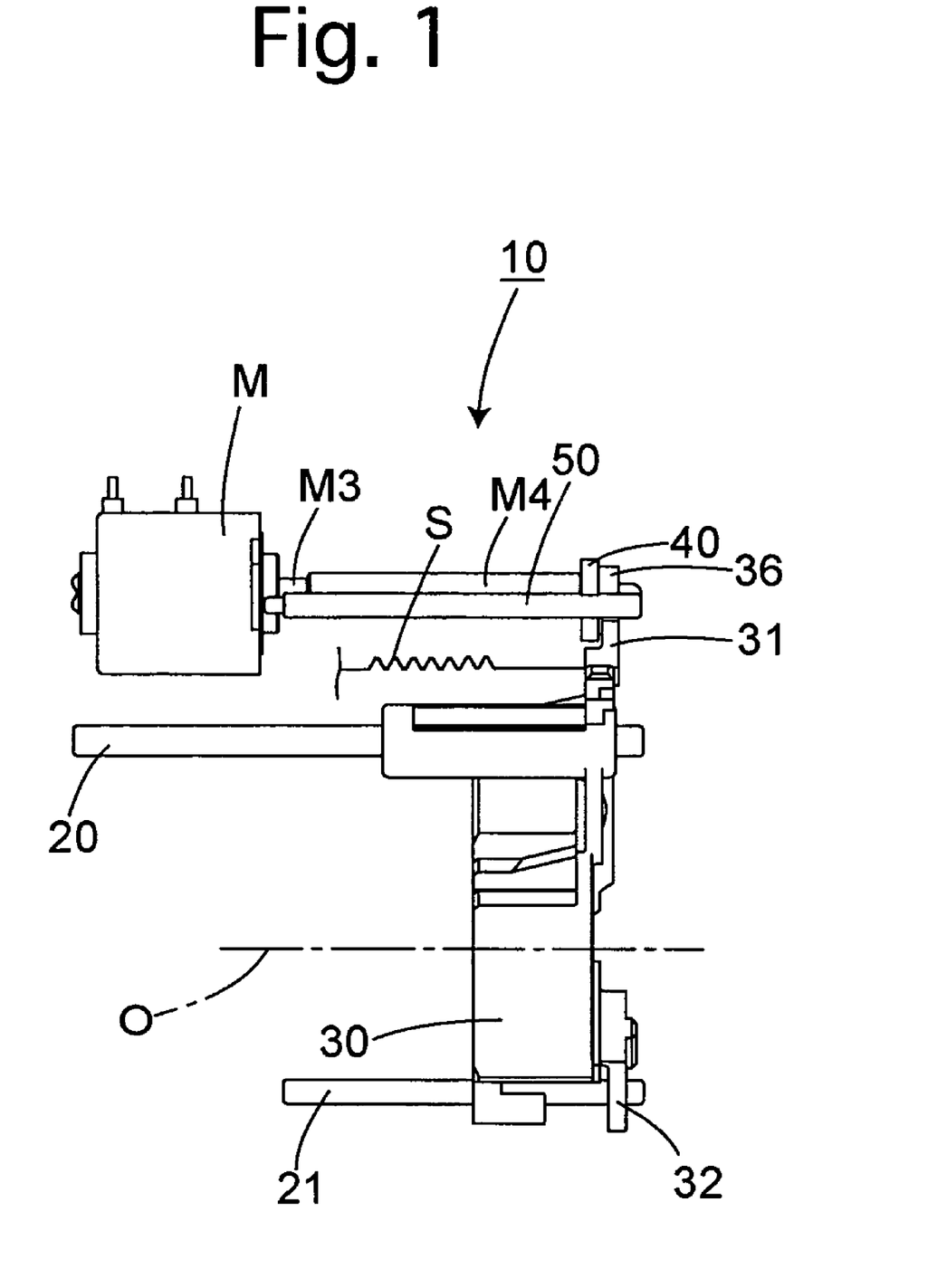
FIG. 1 is a side elevational view of a first embodiment of a lens drive mechanism according to the present invention.
Figure 2:
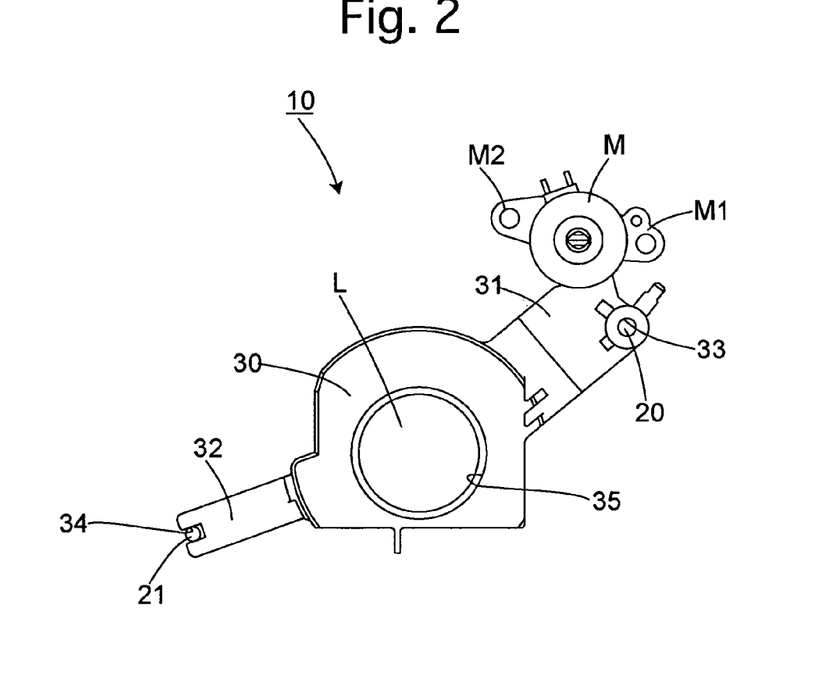
FIG. 2 is a front elevational view of the lens drive mechanism shown in FIG. 1.
Figure 3:
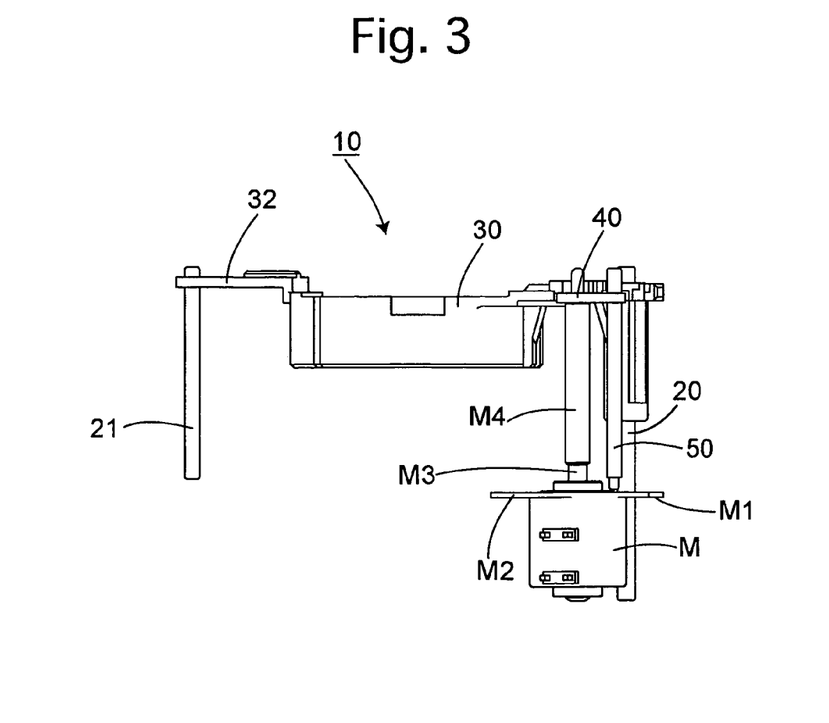
FIG. 3 is a plan view of the lens drive mechanism shown in FIG. 1.

The lens drive mechanism 10 is installed inside a camera body (not shown). The lens drive mechanism 10 is provided with a pair of guide shafts (first and second guide shafts) 20 and 21 parallel to a direction of an optical axis O (forward/rearward direction). The opposite ends (front and rear ends) of each guide shaft 20 and 21 are fixed to the camera body.

The lens drive mechanism 10 is provided with a lens support frame 30 from which a pair of arm portions (first and second arm portions) 31 and 32 project in substantially opposite radial directions. The pair of arm portions 31 and 32 are provided with a guide hole 33 and a guide groove 34 in which the guide shaft 20 and the guide shaft 21 are slidably engaged, respectively. The lens support frame 30 is provided with a lens support hole 35 formed as a through hole extending in the optical axis direction, and a focusing lens group (lens element) L is fitted in the lens support hole 35 to be fixed thereto. A retainer piece 36 projects from a radially outer end of the first arm portion 31. A cutout portion 37 having a substantially semicircular shape is formed at the end of the retainer piece 36 (see FIG. 4). Another lens support frame (not shown), provided independently of the lens support frame 30, for supporting another lens group is positioned immediately in front of the lens support frame 30 (the focusing lens group L) to be movable in the optical axis direction. As shown in FIG. 1, an tension spring S (e.g., a helical tension spring) is installed between the other lens support frame (not shown) and the lens support frame 30 so that opposite ends of the tension spring S are respectively fixed to these two lens support frames to bias the two lens support frames in directions approaching each other.

Figure 4:
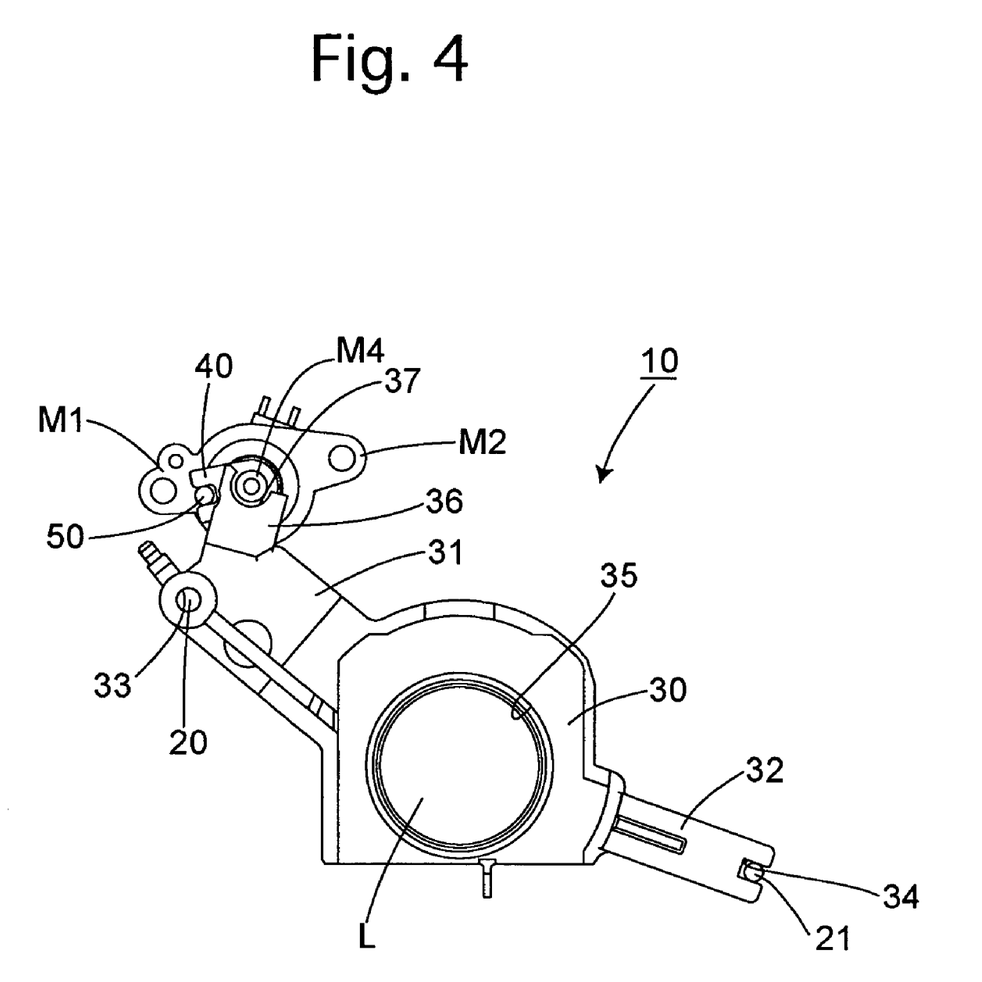
FIG. 4 is a rear elevational view of the lens drive mechanism shown in FIG. 1.

The lens drive mechanism 10 is provided above the guide shafts 20 and 21 with a stepper motor (driving device) M which is electrically connected to a CPU (controller; not shown). Two support tongues M1 and M2 which are formed integral with an outer casing of the stepper motor M are fixed to the camera body by two set screws (not shown) which are respectively inserted/screwed through the two support tongues M1 and M2 to be screwed into the camera body. A rotary output shaft M3 projects from the rear side of the stepper motor M to extend rearwards (toward the image-plane side) in a direction parallel to the optical axis O, and the rear end of the output shaft M3 is rotatably supported by the camera body. A major portion of the outer peripheral surface of the output shaft M3 is threaded so as to serve as a rotatable lead screw (feed screw shaft) M4. As shown in FIG. 4, the rotatable lead screw M4 is partly positioned in the cutout portion 37 of the lens support frame 30.

Figure 5:
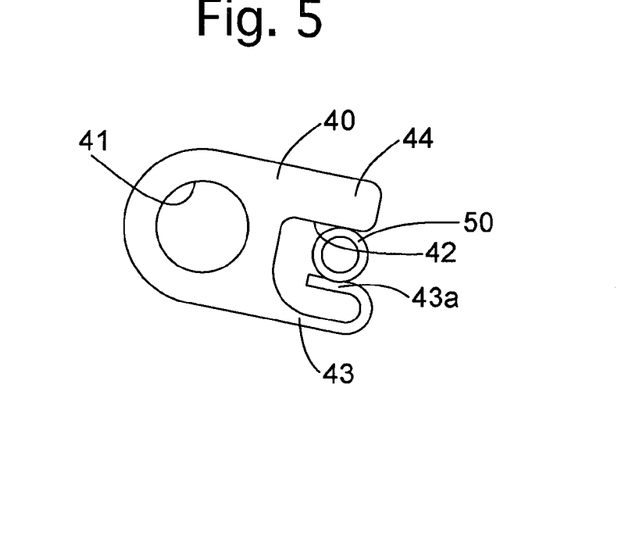
FIG. 5 is an enlarged front elevational view of a nut member and a guide shaft in the lens drive mechanism shown in FIGS. 1 through 4.
Figure 6:
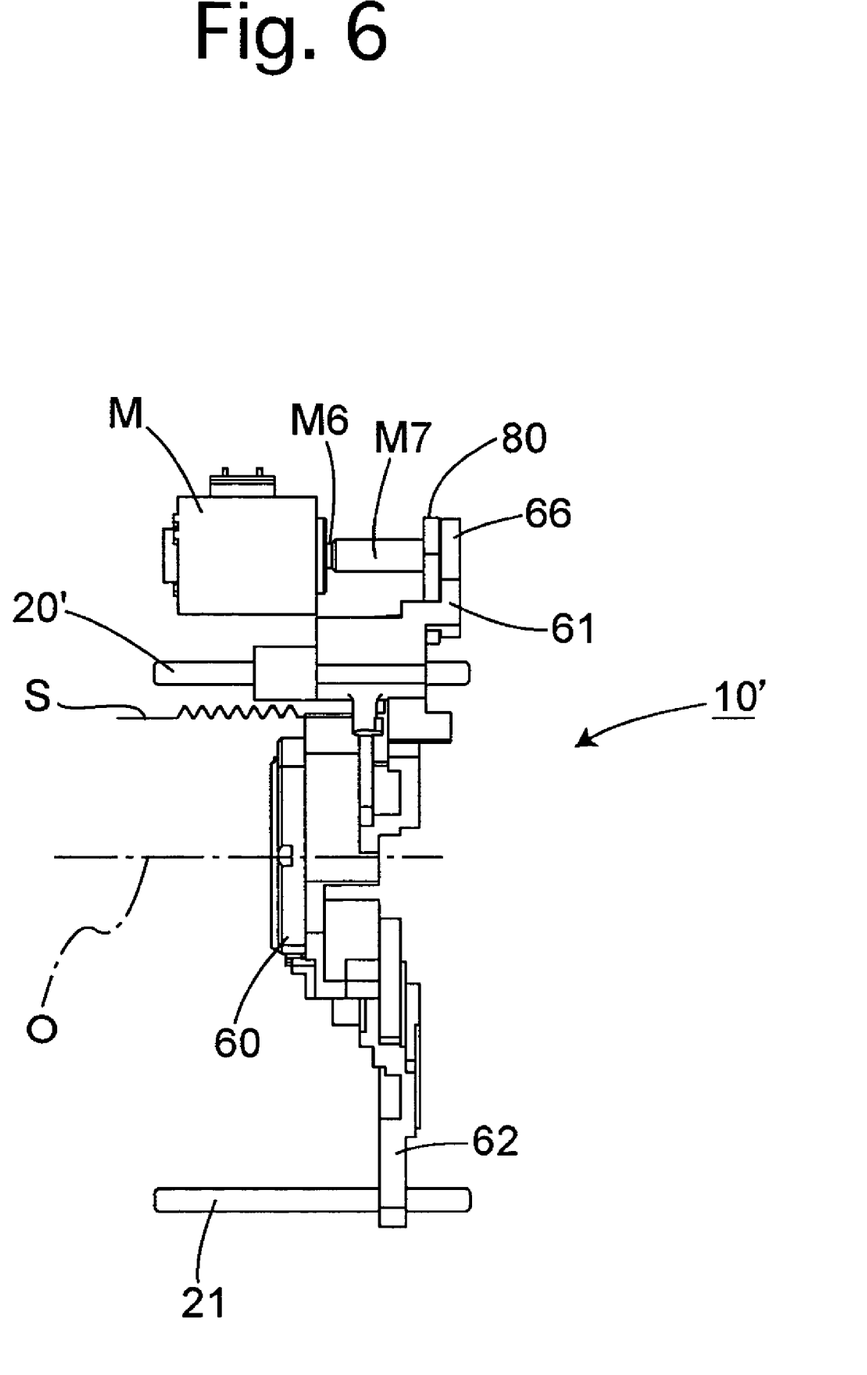
FIG. 6 is a side elevational view of a second embodiment of the lens drive mechanism according to the present invention.
Figure 7:
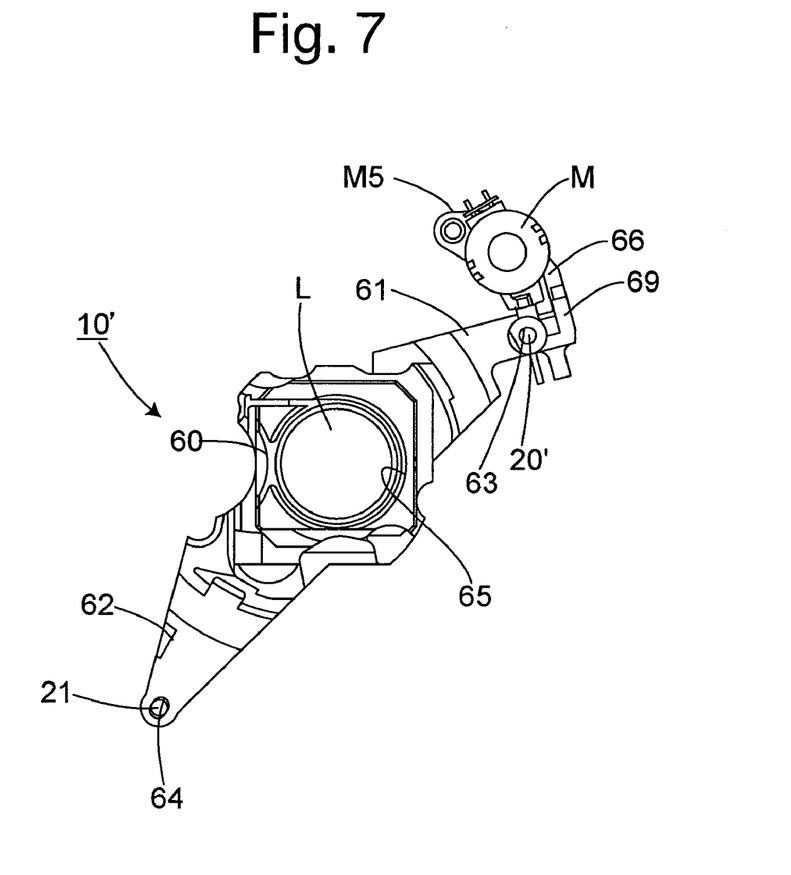
FIG. 7 is a front elevational view of the lens drive mechanism shown in FIG. 6.
Figure 8:
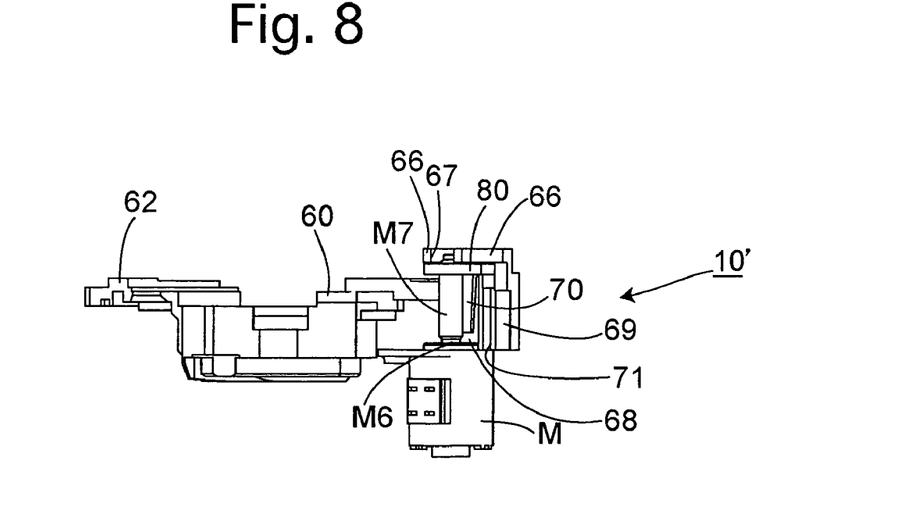
FIG. 8 is a plan view of the lens drive mechanism shown in FIG. 6.

The lens drive mechanism 10 is provided immediately in front of the retainer piece 36 with a nut member (driven member) 40 which is supported by the rotatable lead screw M4. The nut member 40 is molded of synthetic resin. As shown in FIG. 5, the nut member 40 is provided with a female screw hole (screw engaging portion) 41 having a circular shape in cross section in which the rotatable lead screw M4 is engaged. The nut member 40 is further provided, at one end thereof on the opposite side of the nut member 40 from the female screw hole 41, with a resilient holding leaf (holding portion) 43 and a resilient holding projection (holding portion) 44. The resilient holding leaf 43 and the resilient holding projection 44 constitute a rotation-prevention portion. The resilient holding leaf 43 includes a folded leaf portion 43a having the shape of a letter U as viewed from the front of the nut member 40 (as viewed in FIG. 5). An engaging groove 42 is formed between the resilient holding leaf 43 and the resilient holding projection 44. The thickness of the resilient holding leaf 43 (the folded leaf portion 43a) of the nut member 40 is smaller than the remaining portion of the nut member 40. Since the lens support frame 30 is biased forward by the tension spring S as described above, a front surface of the retainer piece 36 and a rear surface of the nut member 40 remain in contact with each other so that the nut member 40 prevents the lens support frame 30 from moving forward against the retainer piece 36.

The lens drive mechanism 10 is provided in the vicinity of the stepper motor M with a guide shaft (non-rotatable guide shaft) 50 which extends parallel to the rotatable lead screw M4. The opposite ends (front and rear ends) of the guide shaft 50 are fixed to the camera body. The guide shaft 50 is engaged in the engaging groove 42 as shown in FIGS. 1, 4 and 5. The diameter of the guide bar 50 is greater than the distance between the resilient holding leaf 43 (the folded leaf portion 43a) and the resilient holding projection 44 when each of the resilient holding leaf 43 and the resilient holding projection 44 is in a free state. Therefore, when the guide shaft 50 is engaged in the engaging groove 42, the resilient holding leaf 43 and the resilient holding projection 44 are resiliently deformed in directions away from each other to be in pressing contact with the guide shaft 50 from opposite directions to thereby hold the guide shaft 50 resiliently between the resilient holding leaf 43 and the resilient holding projection 44. The amount of deformation of the resilient holding leaf 43 (specifically the folded leaf portion 43a thereof) is greater than that of the resilient holding projection 44.

Operations of the first embodiment of the lens drive mechanism 10 having the above described structure will be discussed hereinafter.

Immediately after a shutter release button (not shown) is depressed half way down in AF exposure mode, the aforementioned CPU sends a drive signal to the motor M. If this drive signal is a forward-rotation drive signal, the rotatable lead screw M4 that is integral with the output shaft M3 of the stepper motor M rotates in a forward direction about the axis of the rotatable lead screw M4, and this forward rotation of the rotatable lead screw M4 causes the nut member 40, the female screw hole 41 of which is engaged with the rotatable lead screw M4, to move forward linearly along the guide shaft 50. This forward movement of the nut member 40 causes the lens support frame 30 to move forward together with the nut member 40 by the spring force of the tension spring S. Subsequently, immediately after the focusing lens group L reaches a position thereof at which an in-focus state is obtained, the stepper motor M stops rotating to stop the nut member 40 and the lens support frame 30. Since the resilient holding leaf 43 (the folded leaf portion 43a) and the resilient holding projection 44 resiliently hold the guide shaft 50 therebetween at all times when the nut member 40 linearly moves forward along the guide shaft 50, the nut member 40 (the resilient holding leaf 43 and the resilient holding projection 44) do not rattle relative to the guide shaft 50 during the linear movement of the nut member 40, and accordingly, no objectionable noise is made between the nut member 40 and the guide shaft 50 during linear movement of the nut member 40.

On the other hand, if the drive signal that is output from the CPU is a reverse-rotation drive signal, the rotatable lead screw M4 rotates in a reverse direction on the axis thereof, and this reverse rotation of the rotatable lead screw M4 causes the nut member 40 to move rearward linearly along the guide shaft 50. At this time, the nut member 40 pushes the lens support frame 30 rearward to move the lens support frame 30 rearward against the spring force of the tension spring S. Subsequently, immediately after the focusing lens group L reaches a position thereof at which an in-focus state is obtained, the stepper motor M stops rotating to stop the nut member 40 and the lens support frame 30. Similar to the case when the nut member 40 linearly moves forward along the guide shaft 50, the nut member 40 (the resilient holding leaf 43 and the resilient holding projection 44) does not rattle or make an objectionable noise between the guide shaft 50 when the nut member 40 linearly moves rearward along the guide shaft 50.

According to the above described first embodiment of the lens drive mechanism 10, the nut member 40 can linearly move smoothly along the guide shaft 50 while objectionable noise is effectively prevented from being made between the nut member 40 and the guide shaft 50 during linear movement of the focusing lens group L because the resilient holding leaf 43 and the resilient holding projection 44 resiliently hold the guide shaft 50 therebetween with the use of the resilient force of each of the resilient holding leaf 43 and the resilient holding projection 44 of the nut member 40.

Moreover, the thickness of the nut member 40 in the forward/rearward direction (the optical axis direction) can be reduced for miniaturization of the lens drive mechanism 10 because a portion of the nut member 40 which is screw-engaged with the rotatable lead screw M4 is formed as a female screw hole 41 having a circular shape in cross section. More specifically, the length of the screw-engaged portion between the nut member 40 and the rotatable lead screw M4 needs to be sufficiently long to stabilize linear movement of the nut member 40 (and linear movement of the focusing lens group L), especially in the case where the nut member 40 is made of synthetic resin as in the present embodiment of the lens drive mechanism. However, if a screw engaging portion having a non-circular shape (e.g., semicircular shape) in cross section is formed on the nut member 40 instead of the circular female screw hole 41, a sufficient length of the screw-engaged portion between the nut member 40 and the rotatable lead screw M4, which corresponds to the case of using the nut member 40 having the female screw hole 41, cannot be secured unless the length of the non-circular screw engaging portion is longer than the length of the female screw hole 41 in the forward/rearward direction. Consequently, the length of the nut member 40 on which such a non-circular screw engaging portion is formed would have to be longer than the length of the nut member 40 on which the female screw hole 41 is formed. Therefore, providing the nut member 40 with a non-circular screw engaging portion instead of a circular screw engaging portion (the female screw hole 41) makes it difficult to miniaturize the lens drive mechanism 10.

A second embodiment of the lens drive mechanism according to the present invention will be hereinafter discussed with reference to FIGS. 6 through 10. Elements and portions of the second embodiment of the lens drive mechanism 10' which are substantially the same as those of the first embodiment of the lens drive mechanism 10 are designated by the same reference numerals, and will not be discussed in detail in the following description. In the following description, FIG. 6 serves as a reference of orientation of the lens drive mechanism; the left side and the right side of FIG. 6 correspond to the object side (front side) and the image-plane side (rear side) of the lens drive mechanism 10', respectively.

A first guide shaft 20', which corresponds to the first guide shaft 20 of the first embodiment of the lens guide mechanism 10, and the second guide shaft 21 together constitute a pair of shafts. The first guide shaft 20' is shorter than the first guide shaft 20 of the first embodiment of the lens guide mechanism 10 in the forward/rearward direction. The opposite ends of the guide shaft 20' are fixed to the camera body.

The lens drive mechanism 10' is provided with a lens support frame 60 from which a pair of arm portions (first and second arms) 61 and 62 project in substantially opposite radial directions. The pair of arm portions 61 and 62 are provided with a guide hole 63 and a guide hole 64 in which the first guide shaft 20' and the second guide shaft 21 are slidably engaged, respectively. The lens support frame 60 is provided with a lens support hole 65 formed as a through hole extending in the optical axis direction, and a focusing lens group (lens element) L is fitted in the lens support hole 65 to be fixed thereto. A retainer piece 66 projects from a radially outer tip of the first arm portion 61. A cutout portion 67 having a substantially semicircular shape is formed at an end of the retainer piece 66. The first arm portion 61 is further provided, at the radially outer end thereof immediately before the retainer piece 66, with a prism-like rotation-prevention projection 68 and a prism-like projection 69 which are adjacently arranged in a lateral direction of the lens drive mechanism 10' (in a direction perpendicular to the optical axis) with a predetermined gap therebetween. The rotation-prevention projection 68 is provided on an end surface thereof with a prism-like small rotation-prevention projection 70 having a smaller cross section than the rotation-prevention projection 68. A recessed portion 71 is formed between the prism-like rotation-prevention projection 68 and the prism-like projection 69.

Figure 9:
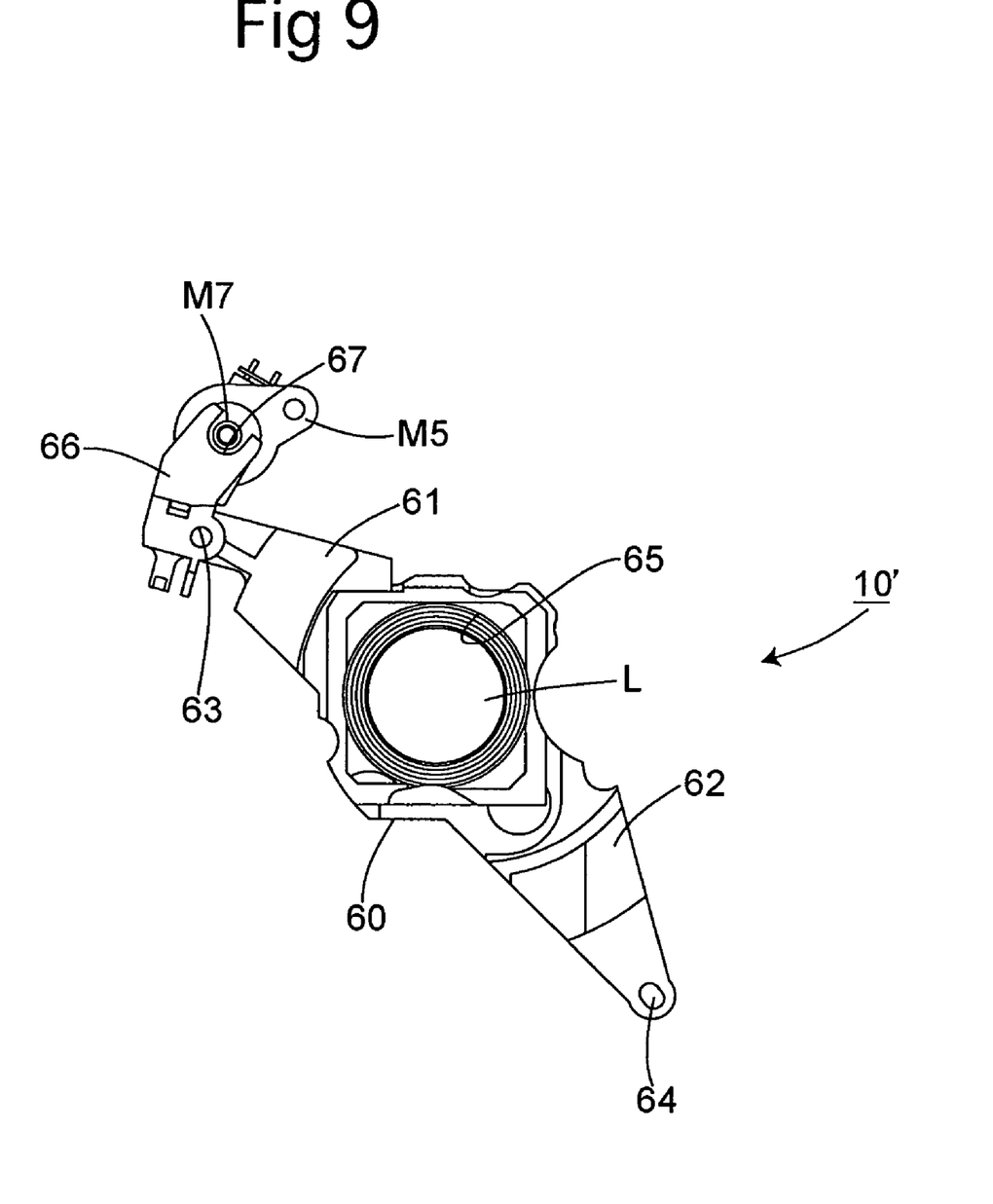
FIG. 9 is a rear elevational view of the lens drive mechanism shown in FIG. 6.

In the second embodiment of the lens drive mechanism 10', a support portion M5 and another support portion (not shown) are formed integral with an outer casing of the stepper motor (driving device) M, and the stepper motor M is fixed to the camera body by two set screws (not shown) which are inserted/screwed through the support portion M5 and the support portion (not shown) to be screwed into the camera body. A rotary output shaft M6 having a shorter length than the rotary output shaft M3 of the first embodiment of the lens drive mechanism 10 projects from the back side of the stepper motor M to extend rearwards (toward the image-plane side). The rear end of the output shaft M6 is supported by the camera body to be freely rotatable. A major part of the outer peripheral surface of the output shaft M6 is threaded so that this threaded portion of the output shaft M6 serves as a rotatable lead screw (feed screw shaft) M7. As shown in FIG. 9, the rotatable lead screw M7 is partly positioned in the cutout portion 67 of the lens support frame 60.

Figure 10:
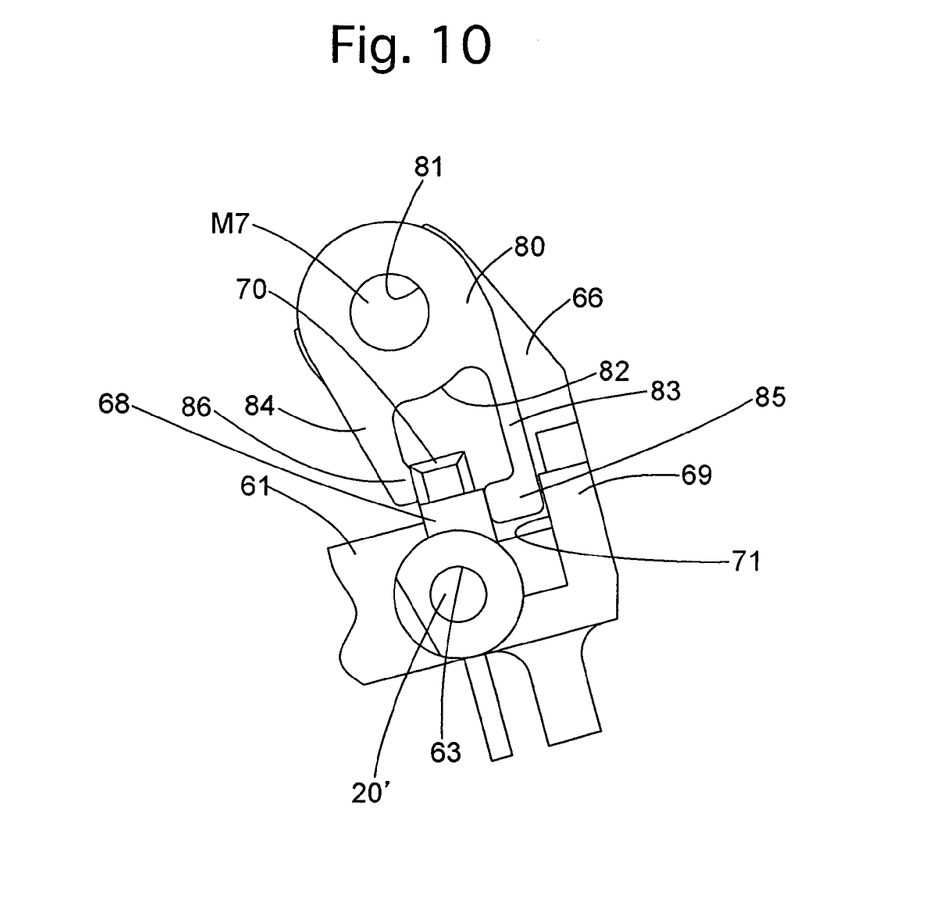
FIG. 10 is an enlarged front elevational view of a portion of the lens drive mechanism shown in FIGS. 6 through 9 which includes a nut member.

The lens drive mechanism 10' is provided immediately in front of the retainer piece 66 with a nut member 80 which is supported by the rotatable lead screw M7. The nut member 80 is molded of synthetic resin like the nut member 40 of the first embodiment. As shown in FIG. 10, the nut member 80 is provided with a female screw hole (screw engaging portion) 81 having a circular shape in cross section in which the rotatable lead screw M7 is engaged. The nut member 80 is further provided, at one end thereof on the opposite side of the nut member 80 from the female screw hole 81, with a first resilient holding projection (holding portion) 83 and a second resilient holding projection (holding portion) 84 between which an engaging groove 82 is formed. The first resilient holding projection 83 and the second resilient holding projection 84 constitute a rotation-prevention portion. The first resilient holding projection 83 is thinner than the remaining portion of the nut member 80, and the second resilient holding projection 84 is thicker than the first resilient holding projection 83. The first resilient holding projection 83 is longer than the second resilient holding projection 84. The first resilient holding projection 83 and the second resilient holding projection 84 are provided, at respective ends thereof on opposed surfaces of the first resilient holding projection 83 and the second resilient holding projection 84, with contacting portions 85 and 86, respectively. As shown in FIG. 10, the contacting portion 86 resiliently contacts an outer surface of the small rotation-prevention projection 70, while the contacting portion 85 is positioned inside of the recessed portion 71 to resiliently contact with an inner surface of the rotation-prevention projection 68. Note that the amount of deformation of the second resilient holding projection 84 is smaller than that of the first resilient holding projection 83. Holding the rotation-prevention projection 68 and the small rotation-prevention projection 70 resiliently by the two contacting portions 85 and 86 from opposite directions in the above described manner prevents the nut member 80 from rotating on the rotatable lead screw M7.

Since the lens support frame 60 is biased forward by the tension spring S, that is installed between the lens support frame 60 and a lens support frame (not shown) positioned immediately in front of the lens support frame 60, a front surface of the retainer piece 66 and a rear surface of the nut member 80 remain in contact with each other so that the nut member 80 prevents the lens support frame 60 from moving forward against the retainer piece 66.

Operations of the second embodiment of the lens drive mechanism 10' having the above described structure will be discussed hereinafter.

Immediately after the CPU sends a forward-rotation drive signal to the motor M, the rotatable lead screw M7 rotates in a forward direction on the axis thereof, and this forward rotation of the rotatable lead screw M7 causes the nut member 80, the female screw hole 81 of which is engaged with the rotatable lead screw M7, to move forward linearly along the rotatable lead screw M7. This forward movement of the nut member 80 causes the lens support frame 60 to move forward together with the nut member 80 by the spring force of the tension spring S. Subsequently, immediately after the focusing lens group L reaches a position thereof at which an in-focus state is obtained, the stepper motor M stops rotating to stop the nut member 80 and the lens support frame 60. On the other hand, immediately after the CPU sends a reverse-rotation drive signal to the motor M, the rotatable lead screw M7 rotates in a reverse direction on the axis thereof, and this reverse rotation of the rotatable lead screw M7 causes the nut member 80 to move rearward linearly along the rotatable lead screw M7. At this time, the nut member 80 pushes the lens support frame 60 rearward to move the lens support frame 60 rearward together with the nut member 80 against the spring force of the tension spring S. Subsequently, immediately after the focusing lens group L reaches a position thereof at which an in-focus state is obtained, the stepper motor M stops rotating to stop the nut member 80 and the lens support frame 60.

Since the contacting portion 85 and the contacting portion 86 resiliently contact with the rotation-prevention projection 68 and the small rotation-prevention projection 70 at all times, respectively, when the nut member 80 linearly moves in the forward/rearward direction of the lens drive mechanism 10', the nut member 80 (the contacting portion 85 and the contacting portion 86) does not rattle relative to the rotation-prevention projection 68 and the small rotation-prevention projection 70, and accordingly, no objectionable noise is made between the nut member 80 and these two the rotation-prevention projections (68 and 70) of the lens support frame 60 during linear movement of the nut member 80, while smooth linear movement of the nut member 80 is ensured.

Although the present invention has been discussed above with reference to the first and second embodiments of the lens drive mechanism, the present invention is not limited solely to these particular embodiments; various changes can be made in these specific embodiments. For instance, it is possible for one and the other of the resilient holding leaf 43 and the resilient holding projection 44 be formed as a resilient portion and a non-resilient portion, respectively, in the first embodiment of the lens drive mechanism 10 and for one and the other of the resilient holding projection 83 and the resilient holding projection 84 be formed as a resilient portion and a non-resilient portion, respectively, in the second embodiment of the lens drive mechanism 10'. Furthermore, it is possible for the lens drive mechanism according to the present invention to be used as a zoom lens drive mechanism for linearly moving a movable lens group which serves as an element of a zoom lens system. Additionally, if the thickness of the nut member (40 or 80) does not have to be reduced, the nut member (40 or 80) can be provided with a screw engaging portion (which corresponds to the screw engaging portion 41 or 81) having non-circular shape in cross section (e.g., a screw engaging portion having a semicircular shape in cross section of which an inner peripheral surface is threaded) in which the rotatable lead screw (M4 or M7) is engaged.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens drive mechanism comprising:
   a rotatable lead screw driven to rotate about an axis thereof, said axis extending parallel to an optical axis of a lens group;
   a non-rotatable guide shaft which extends parallel to said rotatable lead screw;
   a nut member made of synthetic resin which includes a screw engaging portion, with which said rotatable lead screw is screw-engaged, and a rotation-prevention portion, which is engaged with said non-rotatable guide shaft to prevent said nut member from rotating about said rotatable lead screw; and
   a lens support frame which supports said lens group and is movable together with said nut member in an optical axis direction,
   wherein said rotation-prevention portion of said nut member includes a pair of holding portions which are formed integral with said nut member so as to resiliently contact said non-rotatable guide shaft so that at least one of said pair of holding portions is resiliently deformed.

2. The lens drive mechanism according to claim 1, wherein at least one of said pair of holding portions comprises a U-shaped folded portion which is resiliently deformed to be in pressing contact with said non-rotatable guide shaft.

3. The lens drive mechanism according to claim 1, wherein said screw engaging portion of said nut member comprises a female screw hole having a circular shape in cross section.

4. The lens drive mechanism according to claim 1, further comprising a motor for rotating said rotatable lead screw,
   wherein said rotatable lead screw is coaxially formed integral with a rotary output shaft of said motor.

5. The lens drive mechanism according to claim 1, wherein said lens support frame is linearly guided in said optical axis direction by at least one guide shaft extending in said optical axis direction.

6. The lens drive mechanism according to claim 1, wherein said lens support frame is continuously biased in a direction along said optical axis by a spring member.

7. The lens drive mechanism according to claim 1, wherein said lens group comprises a focusing lens group.

8. The lens drive mechanism according to claim 1, wherein said lens group comprises a lens group serving as an element of a zoom lens system.

9. The lens drive mechanism according to claim 1, wherein said pair of holding portions resiliently hold said guide shaft therebetween from opposite directions at all times.

10. The lens drive mechanism according to claim 1, wherein said screw engaging portion comprises a female screw hole in which said rotatable lead screw is screw-engaged.

11. A lens drive mechanism comprising:
    a lens support frame which supports a lens group and is linearly guided along an optical axis without rotating about said optical axis;
    a rotatable lead screw driven to rotate about an axis thereof and extending parallel to said optical axis; and
    a nut member made of synthetic resin which includes a rotation-prevention portion which is engaged with said lens support frame to prevent said nut member from rotating about said rotatable lead screw; and a screw engaging portion with which said rotatable lead screw is screw-engaged, wherein said nut member causes said lens support frame to move together with said nut member in said optical axis direction by a rotation of said rotatable lead screw,
    wherein said rotation-prevention portion of said nut member includes a pair of holding portions which are formed integral with said nut member so as to resiliently contact a rotation-prevention projection, which projects from said lens support frame, so that at least one of said pair of holding portions is resiliently deformed.

12. The lens drive mechanism according to claim 11, wherein said screw engaging portion of said nut member comprises a female screw hole having a circular shape in cross section.

13. The lens drive mechanism according to claim 11, wherein said rotation-prevention projection comprises a first rotation-prevention projection and a second rotation-prevention projection which projects from an end of said first rotation-prevention projection, said second rotation-prevention projection having a smaller cross section than said first rotation-prevention projection,
    wherein said pair of holding portions are in contact with said first rotation-prevention projection and said second rotation-prevention projection from opposite directions, respectively.

14. The lens drive mechanism according to claim 11, further comprising a motor for rotating said rotatable lead screw,
    wherein said rotatable lead screw is coaxially formed integral with a rotary output shaft of said motor.

15. The lens drive mechanism according to claim 11, wherein said lens support frame is linearly guided in said optical axis direction by at least one guide shaft extending in said optical axis direction.

16. The lens drive mechanism according to claim 11, wherein said lens support frame is continuously biased in a direction along said optical axis by a spring member.

17. The lens drive mechanism according to claim 11, wherein said lens group comprises a focusing lens group.

18. The lens drive mechanism according to claim 11, wherein said lens group comprises a lens group serving as an element of a zoom lens system.

* * * * *